US006403149B1

(12) United States Patent
Parent et al.

(10) Patent No.: US 6,403,149 B1
(45) Date of Patent: Jun. 11, 2002

(54) FLUORINATED KETONES AS LUBRICANT DEPOSITION SOLVENTS FOR MAGNETIC MEDIA APPLICATIONS

(75) Inventors: Michael J. Parent, Oakdale; Jason M. Kehren, Woodbury; Richard M. Minday, Stillwater, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/841,383

(22) Filed: Apr. 24, 2001

(51) Int. Cl.$^7$ ................................................. B05D 5/12
(52) U.S. Cl. ........................ 427/130; 427/128; 508/149
(58) Field of Search .................................. 427/130, 128; 508/149

(56) References Cited

U.S. PATENT DOCUMENTS

| | | |
|---|---|---|
| 3,185,734 A | 5/1965 | Fawcett et al. |
| 3,665,041 A | 5/1972 | Sianesi et al. |
| 4,094,911 A | 6/1978 | Mitsch et al. |
| 4,136,121 A | 1/1979 | Martini et al. |
| 4,268,556 A | 5/1981 | Pedrotty |
| 4,671,999 A | 6/1987 | Burguette et al. |
| 4,721,795 A | 1/1988 | Caporiccio et al. |
| 4,746,575 A | 5/1988 | Scarati et al. |
| 4,757,145 A | 7/1988 | Caporiccio et al. |
| 4,803,125 A | 2/1989 | Takeuchi et al. |
| 5,039,432 A | 8/1991 | Ritter et al. |
| 5,049,410 A | 9/1991 | Johary et al. |
| 5,399,718 A | 3/1995 | Costello et al. |
| 5,466,877 A | 11/1995 | Moore |
| 5,663,127 A | 9/1997 | Flynn et al. |
| 5,998,671 A | 12/1999 | Van Der Puy |

FOREIGN PATENT DOCUMENTS

| | | |
|---|---|---|
| WO | WO 96/22356 | 7/1996 |
| WO | WO 00/58956 | 10/2000 |

OTHER PUBLICATIONS

"Fomblin® Z Derivatives", http://www.ausimont.it/docs/fom_thin.html, 3 pages, last updated Dec. 28, 2000.

Primary Examiner—Bernard Pianalto
(74) Attorney, Agent, or Firm—Robert H Jordan

(57) ABSTRACT

A lubricant composition comprising a perfluoropolyether lubricant and fluorinated ketone solvent is described. The lubricant composition can be applied as a coating to a substrate such as magnetic media. After the coating dries, a thin uniform lubricant film covers the substrate surface. The fluorinated ketone solvent can solubilize a wide range of perfluoropolyether compounds but not potential contaminants such as water and hydrocarbons. Additionally, the solvent has low potential to adversely affect global warming.

17 Claims, No Drawings

FLUORINATED KETONES AS LUBRICANT DEPOSITION SOLVENTS FOR MAGNETIC MEDIA APPLICATIONS

FIELD OF INVENTION

The invention relates to a lubricant composition and methods for coating a substrate such as magnetic media with a lubricant.

BACKGROUND OF THE INVENTION

Magnetic media is commonly used in the computer industry for storing large amounts of data. Magnetic recording occurs by moving magnetic media past a magnetic record head consisting of a small electromagnet with a gap. To record information on the magnetic media, a current is applied to the windings of the electromagnet creating a magnetic field in the gap region. The magnetic field affects the polarity of the magnetic materials in the magnetic media that are in close proximity to the head gap. Changing the direction of current flow can reverse the direction of magnetization and the polarity of the magnetic materials. To read information from magnetic media, a read head constructed similarly to the record head is brought into close proximity with the magnetic media. The magnetic field of the magnetic media induces a voltage in the read head. The voltage changes when the direction of the magnetic field from the magnetic media changes.

During normal operation, the magnetic media is moved or rotated relative to the record head with a small space between the media and the head. At the end of the recording process, the magnetic media is often in direct physical contact with the head. The frictional force produced can wear both the head and the magnetic media. Eventually, the frictional force can become large enough to damage either the media or the head.

To minimize the wear of the magnetic disk and head, a lubricant is placed on the surface of the magnetic media. The presence of the lubricant improves the durability of the magnetic media. Typically, the lubricant is a perfluoropolyether (PFPE) with functionalized end groups. Perfluoropolyether lubricants are chemically inert, thermally stable, moisture repellent compositions that possess relatively low surface tension, good lubricity and low volatility. As a result, they can be effective and long-lasting lubricants for magnetic media.

The trend in the computer industry is to increase the recording density. Increasing recording density can be achieved by increasing the output signal of the magnetic media. However, a lubricant layer between the record head and the magnetic material of the magnetic media diminishes the intensity of the signal that can be recorded or read. The decreased signal intensity is due, at least in part, to an increased distance between the head and the magnetic material due to the presence of the lubricant layer. Consequently, to maximize the output signal, a thin lubricant coating is often preferred. State-of-the-art magnetic media typically has a lubricant layer thickness below about 2 nm. The lubricant usually is applied as a dilute solution in a suitable solvent. After application of the lubricant composition, the solvent is evaporated leaving a thin, uniform lubricant coating.

Perfluoropolyethers have been extensively used as lubricants for magnetic media. Various perfluoropolyether lubricants have been described, for example, in U.S. Pat. No. 4,721,795 (Caporiccio et al.) and U.S. Pat. No. 5,049,410 (Johary et al.) Many perfluoropolyether lubricants contain a mixture of perfluoropolyether compounds with a variety of molecular weights and structures. These lubricants have limited solubility in most solvents.

A particularly effective solvent for perfluoropolyethers is 1,1,2-trichloro-1,2,2-trifluoroethane. This chlorofluorocarbon solvent offers the additional advantage of being relatively volatile so it can be removed readily after application of the lubricant composition to magnetic media. However, the 1987 Montreal Protocol calls for reductions in the use of chlorofluorocarbons to minimize degradation of the stratospheric ozone layer.

Certain perfluorinated alkanes have been used in place of chlorofluorocarbons as perfluoropolyether solvents such as those described in U.S. Pat. No. 4,721,795 (Caporiccio et al.). Additionally, U.S. Pat. No. 5,049,410 (Flynn et al.) discloses the use of a perfluorinated, nonaromatic cyclic organic solvent for dissolution of polyfluoropolyether lubricants. However, some of these compounds tend to have relatively long atmospheric lifetimes and can potentially contribute to global warming.

Thus, there is a need for solvents with short atmospheric lifetimes that dissolve polyfluoropolyether lubricants. The invention provides fluorinated ketone solvents with these desirable characteristics.

SUMMARY OF THE INVENTION

The invention provides a lubricant composition comprising about 10 to about 10,000 ppm perfluoropolyether lubricant and about 90 to about 99.9 weight percent fluorinated ketone solvent based on the weight of the lubricant composition. The lubricant compositions can further comprise about 0.1 to about 1000 ppm of an additive such as a cyclic phosphazene compound. The lubricant composition typically has low solubility for possible contaminants such as water, silicones, and general hydrocarbons. Additionally, the lubricant composition can have low global warming potential.

The fluorinated ketone solvent of the invention typically has a total of 5 to 10 carbon atoms. In some embodiments, the fluorinated ketone has 6 to 8 carbon atoms. The solvent can be a perfluoroketone, a compound in which all of the hydrogen atoms on the carbon backbone are replaced with fluorine. Alternatively, the fluorinated ketone solvent can have up to two hydrogen atoms and up to two non-fluorine halogen atoms including bromine, chlorine, and iodine attached to the carbon backbone. One or more heteroatoms can interrupt the carbon backbone of the molecule.

More than one fluorinated ketone solvent can be used in the lubricant composition. In some embodiments, one or more miscible solvents can replace a portion of the fluorinated ketone solvent. For example, up to about 10 weight percent of the fluorinated ketone can be replaced with another miscible solvent.

Typically, the perfluoropolyether lubricant comprises a perfluoropolyether molecule represented by the formula:

where y and z are integers independently ranging from 0 to about 20. The variables k, m, n, and p are integers independently ranging from 0 to about 200; the sum of k, m, n, and p ranges from 2 to about 200. Groups A and A' are independently selected monovalent organic moieties.

Another aspect of the invention provides a method of lubricating a substrate. The method comprises applying a coating of a lubricant composition to a substrate followed by drying the coating to form a lubricant film on the surface of the substrate. Typically, the substrate is magnetic media such as a thin film or hard disk.

DETAILED DESCRIPTION OF ILLUSTRATIVE EMBODIMENTS OF THE INVENTION

The invention relates to a lubricant composition and methods of coating a substrate with a lubricant. In particular, the invention provides a lubricant composition comprising about 10 to about 10,000 ppm of a perfluoropolyether lubricant and about 90 to about 99.9 weight percent fluorinated ketone solvent based on the weight of the lubricant composition. The lubricant composition can be applied to form a thin, uniform layer of lubricant on a substrate. The substrate is typically magnetic media such as a thin film or hard disk.

The fluorinated ketone solvent of the invention typically has a total of 5 to 10 carbon atoms. In some embodiments, the fluorinated ketone has 6 to 8 carbon atoms. The fluorinated ketone solvent typically has a boiling point less than about 150° C. In some embodiments, the boiling point is less than about 100° C. To provide adequate solvency for the perfluoropolyether lubricant, the fluorinated ketone solvent is highly fluorinated. The solvent can be a perfluoroketone, a compound in which all of the hydrogen atoms on the carbon backbone are replaced with fluorine. Alternatively, the fluorinated ketone solvent can have up to two hydrogen atoms and up to two non-fluorine halogen atoms including bromine, chlorine, and iodine attached to the carbon backbone.

Representative examples of perfluorinated ketone compounds suitable as solvents for perfluoropolyether lubricants include $CF_3(CF_2)_5C(O)CF_3$, $CF_3C(O)CF(CF_3)_2$, $CF_3CF_2CF_2C(O)CF_2CF_2CF_3$, $CF_3CF_2C(O)CF(CF_3)_2$, $(CF_3)_2CFC(O)CF(CF_3)_2$, $(CF_3)_2CFCF_2C(O)CF(CF_3)_2$, $(CF_3)_2CF(CF_2)_2C(O)CF(CF_3)_2$, $(CF_3)_2CF(CF_2)_3C(O)CF(CF_3)_2$, $CF_3(CF_2)_2C(O)CF(CF_3)_2$, $CF_3(CF_2)_3C(O)CF(CF_3)_2$, $CF_3(CF_2)_4C(O)CF(CF_3)_2$, $CF_3(CF_2)_5C(O)CF(CF_3)_2$, $CF_3CF_2C(O)CF_2CF_2CF_3$, perfluorocyclopentanone, and perfluorocyclohexanone.

Representative examples of fluorinated ketones with either one or two atoms other than fluorine attached to the carbon backbone include $CHF_2CF_2C(O)CF(CF_3)_2$, $CF_3C(O)CH_2C(O)CF_3$, $(CF_3)_2CFC(O)CF_2Cl$, $CF_2ClCF_2C(O)CF(CF_3)_2$, $CF_2Cl(CF_2)_2C(O)CF(CF_3)_2$, $CF_2Cl(CF_2)_3C(O)CF(CF_3)_2$, $CF_2Cl(CF_2)_4C(O)CF(CF_3)_2$, $CF_2Cl(CF_2)_5C(O)CF(CF_3)_2$, and $CF_2ClCF_2C(O)CF_2CF_2CF_3$.

The fluorinated ketone can also contain one or more heteroatoms interrupting the carbon backbone. Suitable heteroatoms include, for example, nitrogen, oxygen and sulfur atoms. Representative compounds include $CF_3OCF_2CF_2C(O)CF(CF_3)_2$, $CF_3OCF_2C(O)CF(CF_3)_2$, and the like.

Fluorinated ketones can be prepared by known methods. One approach involves the dissociation of perfluorinated carboxylic acid esters of the formula $R_fCO_2CF(R_f')_2$ with a nucleophilic initiating agent as described in U.S. Pat. No. 5,466,877 (Moore). $R_f$ and $R_f'$ are fluorine or a perfluoroalkyl group. The fluorinated carboxylic acid ester precursor can be derived from the corresponding fluorine-free or partially fluorinated hydrocarbon ester by direct fluorination with fluorine gas as described in U.S. Pat. No. 5,399,718 (Costello et al.).

Perfluorinated ketones that are alpha-branched to the carbonyl group can be prepared as described in U.S. Pat. No. 3,185,734 (Fawcett et al.). Hexafluoropropylene is added to acyl halides in an anhydrous environment in the presence of fluoride ion. Small amounts of hexafluoropropylene dimer or trimer impurities can be removed by distillation from the perfluoroketone. If the boiling points are too close for fractional distillation, the dimer or trimer impurity can be removed by oxidation with alkali metal permanganate in a suitable organic solvent such as acetone, acetic acid, or a mixture thereof. The oxidation reaction is typically carried out in a sealed reactor at ambient or elevated temperatures.

Linear perfluorinated ketones can be prepared by reacting a perfluorocarboxylic acid alkali metal salt with a perfluorocarbonyl acid fluoride as described in U.S. Pat. No. 4,136,121 (Martini et al.) Such ketones can also be prepared by reacting a perfluorocarboxylic acid salt with a perfluorinated acid anhydride in an aprotic solvent at elevated temperatures as described in U.S. Pat. No. 5,998,671 (Van Der Puy).

All the above-mentioned patents describing the preparation of fluoroketones are incorporated by reference in their entirety.

More than one fluorinated ketone solvent can be used in the lubricant composition. In some embodiments, one or more miscible solvents can replace a portion of the fluorinated ketone solvent. For example, up to about 10 weight percent of the fluorinated ketone can be replaced with another miscible solvent. Suitable miscible solvents include, for example, hydrofluorocarbons, hydrochlorofluorocarbons, perfluorocarbons, perfluoropolyethers, hydrofluoroethers, hydrochlorofluoroethers, hydrofluoropolyethers, fluorinated aromatic compounds, chlorofluorocarbons, bromofluorocarbons, bromochlorofluorocarbons, hydrobromocarbons, iodofluorocarbons, and hydrobromofluorocarbons. In some embodiments, the co-solvent includes hydrofluorocarbons, hydrofluoroethers, hydrochlorofluorocarbons, perfluorocarbons, chlorofluorocarbons, bromofluorocarbons, bromochlorofluorocarbons, hydrobromofluorocarbons, and mixtures thereof. In other embodiments, hydrofluorocarbons, hydrofluoroethers, hydrochlorofluorocarbons, perfluorocarbons, and hydrobromofluorocarbons are utilized. These co-solvents typically contain from 5 to 10 carbon atoms and have a boiling point less than about 150° C. or less than about 100° C. Representative solvents include $CF_3CH_2CF_2CH_3$, $C_5F_{11}H$, $C_6F_{13}H$, $CF_3CFHCFHCF_2CF_3$, $C_6F_{14}$, $C_7F_{16}$, $C_8F_{18}$, $(C_4F_9)_3N$, perfluoro-N-methylmorpholine, $C_4F_9OCH_3$, $F(C_3F_6O)_2CF_2H$, $HCF_2O(CF_2O)_m(CF_2CF_2O)_nCF_2H$ (where m is an integer from 0 to 8; n is an integer from 0 to 4; and the sum of n plus m is from 0 to 8), $F(C_3F_6O)_2CF_2H$, $C_3F_7CF(OC_2H_5)$ $CF(CF_3)_2$, $C_4F_9OC_2H_5$, $C_4F_9$-c-$C_4F_7O$, and $C_3F_5HCl_2$.

The fluorinated ketones typically have low solubility for impurities usually associated with a lubrication deposition system. These impurities include, for example, dioctylphthalates, silicones, water, and general hydrocarbons. If these impurities are coated on the magnetic media, they can adversely affect the performance of the magnetic media. A solvent with low solubility for impurities can result in lubricant coatings with fewer contaminates. Additionally, the useful lifetime of the lubrication deposition system can be extended through the use of a solvent with low solubility for impurities. When the concentration of the impurities in the lubrication deposition system reaches an unacceptable level, the contaminated solvent is generally discarded and replaced with fresh solvent. Extending the lifetime of the lubrication deposition system can potentially decrease cost associated with the lubrication deposition process and the amount of waste generated.

Perfluoroketones, though fully fluorinated, have a much lower global warming potential (GWP) than perfluorocarbons, i.e. fully fluorinated hydrocarbons that do not contain ketone groups. As used herein, "GWP" is a relative measure of the warming potential of a compound based on the structure of the compound. The GWP of a compound, as defined by the Intergovernmental Panel on Climate Change (IPCC) in 1990 and updated in 1998 (World Meteorological Organization, *Scientific Assessment of Ozone Depletion*: 1998, Global Ozone Research and Monitoring Project—Report No. 44, Geneva, 1999), is calculated as the warming due to the release of 1 kilogram of a compound relative to the warming due to the release of 1 kilogram of $CO_2$ over a specified integration time horizon (ITH):

$$GWP_x(t') = \frac{\int_0^{ITH} F_x C_{Ox} e^{-t/\tau x} dt}{\int_0^{ITH} F_{CO_2} C_{CO_2}(t) dt}$$

where F is the radiative forcing per unit mass of a compound (the change in the flux of radiation through the atmosphere due to the IR absorbance of that compound), C is the atmospheric concentration of a compound, $\tau$ is the atmospheric lifetime of a compound, t is time and x is the compound of interest (i.e., $C_{Ox}$ is the time 0 or initial concentration of compound x).

The commonly accepted ITH is 100 years representing a compromise between short term effects (20 years) and longer term effects (500 years or longer). The concentration of an organic compound in the atmosphere is assumed to follow pseudo first order kinetics (i.e., exponential decay). The concentration of $CO_2$ over that same time interval incorporates a more complex model for the exchange and removal of $CO_2$ from the atmosphere (the Bern carbon cycle model).

$CF_3CF_2C(O)CF(CF_3)_2$ has an atmospheric lifetime of approximately 5 days based on photolysis studies at 300 nm. Other perfluoroketones show similar absorbances and thus are expected to have similar atmospheric lifetimes. A measured IR cross-section was used to calculate the radiative forcing value for $CF_3CF_2C(O)CF(CF_3)_2$ using the method of Pinnock, et al. (*J. Geophys. Res.*, 100, 23227, 1995). Using this radiative forcing value and the 5 day atmospheric lifetime, the GWP (100 year ITH) for a perfluoroketone with 6 carbon atoms is 1 while the GWP for $C_2F_6$ is 11,400. The fluorinated ketones of the invention typically have a GWP less than about 10. As a result of their rapid degradation in the lower atmosphere, the fluorinated ketones have short lifetimes and would not be expected to contribute significantly to global warming.

Additionally, the fluorinated ketones have low toxicity. For example, the perfluoroketone $CF_3CF_2C(O)CF(CF_3)_2$ has low acute toxicity based on short-term inhalation tests with rats. The "no-effect" level for cardiac sensitization for $CF_3CF_2C(O)CF(CF_3)_2$ is >150,000 ppm, comparable to the "no-effect" level for perfluorohexane ($C_6F_{14}$), a perfluorocarbon with a comparable number of carbon atoms that has a long history of safe use.

The perfluoropolyether lubricant includes one or more perfluoropolyether compounds containing the repeating unit $-(C_aF_{2a}O)-$ in which a is an integer from 1 to about 8 or from 1 to about 4. These repeating units can be linear or branched. Many of the perfluoropolyether lubricants useful in the invention have been described previously such as in U.S. Pat. No. 4,671,999 (Burguette et al.), U.S. Pat. No. 4,268,556 (Pedrotty), U.S. Pat. No. 4,803,125 (Takeuchi et al.), U.S. Pat. No. 4,721,795 (Caporiccio et al.), U.S. Pat. No. 4,746,575 (Scaretti et al.), U.S. Pat. No. 4,094,911 (Mitsch et al.), and U.S. Pat. No. 5,663,127 (Flynn et al.). These patents are hereby incorporated by reference.

Typically, the perfluoropolyether lubricant is a liquid at room temperature. Such a lubricating liquid, otherwise known as a fluid, can have a wide range of viscosities. In some embodiments, the lubricant is a viscous oil. The molecular weight is usually high enough to prevent volatilization or removal of the lubricant from the substrate during use. When the substrate is a magnetic disk, the molecular weight of the lubricant is usually high enough to prevent the removal of the lubricant by centrifugal forces created when the disk is rotated relative to either the read or record head.

Typically, the perfluoropolyether lubricant can be represented by the formula:

A—[(C_yF_{2y})O(C_4F_8O)_k(C_3F_6O)_m(C_2F_4O)_n(CF_2O)_p(C_zF_{2z})]—A'     I where y and z are independent integers from 0 to about 20; the variables k, m, n, and p are independent integers from 0 to about 200; and the sum of k, m, n, and p is from 2 to about 200. The repeating units can be randomly distributed in the backbone of the lubricant molecule. Each of the groups $C_yF_{2y}$, $C_zF_{2z}$, $C_4F_8O$, $C_3F_6O$, and $C_2F_4O$ in Formula I can be linear or branched. The A and A' end groups are independently selected monovalent organic moieties that have from 1 to 20 carbon atoms. The end groups can be either hydrogen-containing or nonhydrogen-containing and can include heteroatoms such as oxygen, nitrogen, sulfur, or a halogen other than fluorine.

In some embodiments, a major amount of the lubricant includes perfluoropolyether compounds containing at least one hydrogen-containing end group. In this embodiment, minor amounts of the lubricant can include compounds having only nonhydrogen-containing end groups. In another embodiment, a major amount of the lubricant includes perfluoropolyether compounds containing two hydrogen-containing end groups. In this embodiment, minor amounts of the lubricant can include compounds having only one hydrogen-containing end group or two nonhydrogen-containing end groups.

Nonhydrogen-containing A and A' groups include, for example, —$CF_2CF_3$, —$CF_3$, —F, —$OCF_2CF_3$, —$CF_3$, —$CF_2C(O)F$, and —$C(O)F$. An example of a perfluoropolyether with nonhydrogen-containing end groups is:

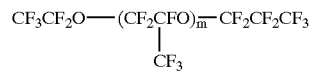

where m is an integer having a value such that the lubricant has a number average molecular weight in the range of 1000 to 5000. This type of lubricant is commercially available as KRYTOX™ 142 from E. I. Dupont deNemours & Company of Wilmington, Del.. Other nonhydrogen-containing perfluoropolyether lubricants include, for example, certain types of FOMBLIN™ fluids such as FOMBLIN™ Y and Z (available from Montedison S.p.A. of Milan, Italy) as well as certain types of DEMNUM™ fluids such as DEMNUM™ SA and SP (available from Dalkin Industries, Ltd. of Tokyo, Japan).

Examples of hydrogen-containing A and A' groups are alkyl, aryl, and alkaryl groups, which can be partially substituted with fluorine atoms and can contain heteroatoms, such as oxygen, sulfur, and nitrogen, for example. Particularly useful examples of such hydrogen-containing end groups include:

(a) —B—D groups wherein:
  (i) B is: —CH$_2$O—, —CH$_2$—O—CH$_2$—, —CF$_2$—, and —CF$_2$O—; and
  (ii) D is:

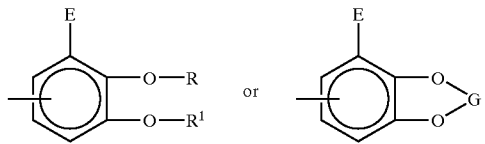

wherein R and R$^1$ are independently alkyl groups having 1 to 3 carbon atoms; G is a divalent alkyl group having 1 to 5 carbon atoms; and E is —H, —OH, —OCH$_3$, —OC$_2$H$_5$, or —OC$_3$H$_7$ (each R, R$^1$, and G group can be substituted with one or more halogen atoms);

(b) —(C$_t$H$_{2t}$)SH, —(C$_t$H$_{2t}$)SR$^2$, —(C$_t$H$_{2t}$)NR$^2{}_2$, —CO$_2$R$^2$, —(C$_t$H$_{2t}$)CO$_2$H, —(C$_t$H$_{2t}$)SiR$^2{}_z$Q$_{3-z}$, —(C$_t$H$_{2t}$)CN, —(C$_t$H$_{2t}$)NCO, —(C$_t$H$_{2t}$)CH=CH$_2$,

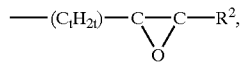

—(C$_t$H$_{2t}$—)CO$_2$R$^2$, —(C$_t$H$_{2t}$)OSO$_2$CF$_3$, —(C$_t$H$_{2t}$)OC(O)Cl, —(C$_t$H$_{2t}$)OCN, —(O)COC(O)—R$^2$, —(C$_t$H$_{2t}$)X, —CHO, —(C$_t$H$_{2t}$)CHO, —CH(OCH$_3$)$_2$, —(C$_t$H$_{2t}$)CH(OCH$_3$)$_2$, —(C$_t$H$_{2t}$)SO$_2$Cl, —C(OCH$_3$)=NH, —C(NH$_2$)=NH, —(C$_t$H$_{2t}$)OC(O)CH=CH$_2$, —(C$_t$H$_{2t}$)OC(O)C(CH$_3$)=CH$_2$,

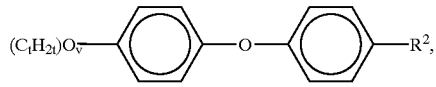

—(C$_t$H$_{2t}$)OR$^2$, —(C$_t$H$_{2t}$)OC(O)R$^2$, —(C$_t$H$_{2t}$)(C$_t$H$_{2t}$O)$_x$H,

wherein Q is —OH, —OR$^3$, —H, —Cl, —F, —Br, or —I; R$^2$ is hydrogen, an aryl group containing 6 to 10 carbons, or an alkyl group containing 1 to 4 carbons; R$^3$ is an alkyl group containing 1 to 4 carbons; X is Cl, Br, F, or I; z is an integer ranging from 0 to 2; x is an integer ranging from 1 to 10; v is an integer ranging from 0 to 1; and t is an integer ranging from 1 to 4;

(c) —OCR$^4$R$^5$R$^6$, where in R$^4$ is hydrogen, an alkyl or fluoroalkyl group containing 1 to 4 carbons; R$^5$ is hydrogen or an alkyl group containing 1 to 4 carbons;

and R$^6$ is fluoroalkyl group containing 1 to 4 carbon atoms; and

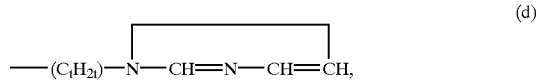

where t is defined as above.

Specific examples of particularly preferred perfluoropolyethers having functional end groups according to formula I include:

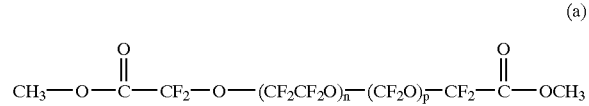

wherein n and p are integers, each having an independent value such that the lubricant has a number average molecular weight in the range of 1000 to 5000 (an example of such a compound is commercially available as FOMBLIN™ Z-DEAL from Montedison S.p.A. of Milan, Italy);

wherein n and p are integers, each having an independent value such that the lubricant has a number average molecular weight in the range of 1000 to 5000 (examples of such compounds are commercially available as FOMBLIN™ AM 2001 and AM 3001 from Montedison S.p.A. of Milan, Italy);

(c) HOCH$_2$—CF$_2$—O—(CF$_2$CF$_2$O)$_n$—(CF$_2$O)$_p$—CF$_2$—CH$_2$OH wherein n and p are integers, each having an independent value such that the lubricant has a number average molecular weight in the range of 1000 to 5000 (an example of such a compound is commercially available as FOMBLIN™ Z-DOL from Montedison S.p.A. of Milan, Italy);

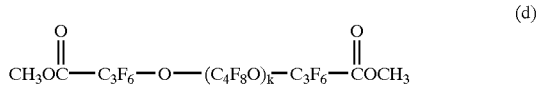

wherein k is an integer having a value such that the lubricant has a number average molecular weight in the range of 1000 to 5000;

(e) HOCH$_2$—C$_3$F$_6$—O—(C$_4$F$_8$O)$_k$—C$_3$F$_6$—CH$_2$OH wherein k is an integer having a value such that the lubricant has a number average molecular weight in the range of 1000 to 5000;

(f)

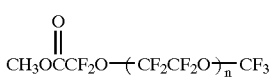

wherein n is an integer having a value such that the lubricant has a number average molecular weight in the range of 1000 to 5000;

(g) $HOCH_2CF_2O\text{-}(CF_2CF_2O)_n\text{-}CF_3$
wherein n is an integer having a value such that the lubricant has a number average molecular weight in the range of 1000 to 5000;

(h)

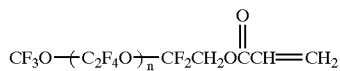

wherein n is an integer having a value such that the lubricant has a number average molecular weight in the range of 1000 to 5000;

(i)

wherein m is an integer having a value such that the lubricant has a number average molecular weight in the range of 1000 to 5000 (an example of such a compound is commercially available as DEMNUM™ ester from Daikin Industries, Ltd.);

(j) $CF_3CF_2CF_2O\text{-}(CF_2CF_2CF_2O)_m\text{-}CF_2CF_2CH_2OH$
wherein m is an integer having a value such that the lubricant has a number average molecular weight in the range of 1000 to 5000 (an example of such a compound is commercially available as DEMNUM™ alcohol from Daikin Industries, Ltd.);

(k) $OCNCH_2\text{—}CF_2\text{—}O\text{—}(CF_2CF_2O)_n\text{—}CF_2O)_p\text{—}CF_2\text{—}CH_2NCO$
wherein n and p are integers, each having an independent value such that the lubricant has a number average molecular weight in the range of 1000 to 5000 (an example of such a compound is commercially available as FOMBLIN™ Z-DISOC from Montedison S.p.A. (Milan, Italy));

(l) $H(OH_4C_2)_{1.5}OCH_2\text{—}CF_2\text{—}O\text{—}(CF_2CF_2O)_n\text{—}(CF_2O)_p\text{—}CF_2\text{—}CH_2O(C_2H_4O)_{1.5}H$
wherein n and p are integers, each having an independent value such that the lubricant has a number average molecular weight in the range of 1000 to 5000 (an example of such a compound is commercially available as FOMBLIN™ Z-DOL-TX from Montedison S.p.A. (Milan, Italy));

(m)

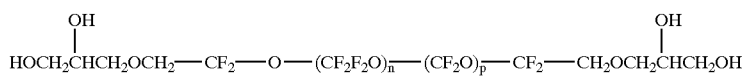

wherein n and p are integers, each having an independent value such that the lubricant has a number average molecular weight in the range of 1000 to 5000 (an example of such a compound is commercially available as FOMBLIN™ Z-TETRAOL from Montedison S.p.A. (Milan, Italy)): and (n)

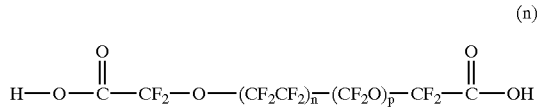

wherein n and p are integers, each having an independent value such that the lubricant has a number average molecular weight in the range of 1000 to 5000 (an example of such a compound is commercially available as FOMBLIN™ Z-DIAC from Montedison S.p.A. of Milan, Italy).

Methods of making compounds according to the formulae listed as examples (d) to (h) are described in U.S. Pat. No. 5,039,432 (Ritter et al.), which is incorporated by reference.

In some embodiments, the lubricant compositions further comprises various additives. Suitable additives include, for example, cyclic phosphazene compounds such as Dow X-1P and X-100 (available from Dow Chemical of Midland, Mich.). The additives can enhance the performance of the lubricant, for example, by reducing the rate of lubricant breakdown and wear. The additives are usually added at levels from about 0.1 ppm to about 1000 ppm based on the weight of the lubricant composition. In other embodiments, the additives are present in concentrations from about 1 ppm to about 300 ppm or from about 10 ppm to about 250 ppm.

Another aspect of the invention provides a method of lubricating a substrate. The method comprises applying a coating of a lubricant composition to a substrate followed by removing the solvent from the coating to form a neat lubricant film. The lubricant composition comprises about 10 to about 10,000 ppm perfluoropolyether lubricant and about 90.0 to about 99.9 weight percent fluorinated ketone solvent based on the weight of the lubricant composition. The fluorinated ketone solvent is removed during the drying step. Typically, the substrate is magnetic media including, for example, thin films and hard disks. The magnetic media typically consists of a base layer such as glass, aluminum or a polymeric material and a magnetic layer containing iron, cobalt, nickel, or the like. The magnetic media can contain optional layers of carbon or other materials to enhance, for example, durability and performance of the media. The lubricant is usually applied as the outermost layer.

To meet the demands for increased data storage densities, the magnetic recording industry has had to develop magnetic media with significantly higher signal output levels. The higher signal output levels have been achieved, at least in part, by providing smoother, lower defect magnetic media containing thinner lubricant coatings. The decreased thickness of the lubricant coating allows the magnetic head to be in closer proximity to the magnetic material in the media. However, if the thickness of lubricant coating is too thin, the durability of the magnetic media can be compromised. The thickness of the lubricant layer is typically less than about 2 nm in state-of-the-art magnetic media.

Although the lubricant composition can be applied to the substrate by any known process, two methods are widely used for application of lubricants to hard disks. The first method involves placing a hard disk in a coating chamber.

The lubricant composition is pumped into the coating chamber to completely cover the disk. The lubricating composition is then drained from the chamber at a controlled rate leaving a uniform coating on surface of the disk. The second application method involves dipping a hard disk into a vessel containing the lubricant composition and then slowly pulling the disk back out.

With either the draining or dipping application method, the thickness of the lubricant coating can be controlled by varying the concentration of the lubricant in the lubricant composition and the speed of either draining the lubricant composition or pulling the disk out of the lubricant composition. Lowering the concentration of the perfluoropolyether in the lubricant composition can decrease the thickness of the lubricant coating. Similarly, either decreasing the rate of removal of the hard disk from the lubricant composition using the draining technique or decreasing the rate of removal of the hard disk from the lubricant composition using the dipping technique can decrease the thickness of the lubricant coating.

The fluorinated ketone solvent can be removed, for example, by drying or evaporating at ambient or higher temperatures. Temperatures up to about 150° C. can be used for solvent removal. The rate of removal can be increased through the use of a non-reactive gas such as, for example, nitrogen or argon to assist evaporation of the solvent. As the solvent is removed, the lubricant forms a uniform film over the substrate.

The following examples further describe the lubricant compositions, methods of using the lubricant compositions, and the tests performed to determine the various characteristics of the lubricant compositions. The examples are provided for exemplary purposes to facilitate understanding of the invention and should not be construed to limit the invention to the examples.

EXAMPLES

Preparation, Sources for Organofluorine Compounds Evaluated $CF_3CF_2C(O)CF(CF_3)_2$—1,1,1,2,4,4,5,5,5-nonafluoro-2-trifluoromethyl-pentan-3-one Into a clean dry 600 mL Parr reactor equipped with stirrer, heater and thermocouple were added 5.6 g (0.10 mol) of anhydrous potassium fluoride (available from Sigma Aldrich Chemical Co., Milwaukee, Wis.) and 250 g of anhydrous diglyme (anhydrous diethylene glycol dimethyl ether, available from Sigma Aldrich Chemical Co., Milwaukee, Wis.). The anhydrous potassium fluoride used in this synthesis, and in all subsequent syntheses, was spray dried, stored at 125° C. and ground shortly before use. The contents of the reactor were stirred while 21.0 g (0.13 mol) of $C_2F_5COF$ (approximately 95.0 percent purity available from 3M Company, St. Paul, Minn.) was added to the sealed reactor. The reactor and its contents were then heated, and when a temperature of 70° C. had been reached, a mixture of 147.3 g (0.98 mol) of $CF_2=CFCF_3$ (hexafluoropropylene, available from Sigma Aldrich Chemical Co.) and 163.3 g (0.98 mol) of $C_2F_5COF$ was added over a 3.0 hour time period. During the addition of the hexafluoropropylene and the $C_2F_5COF$ mixture, the pressure was maintained at less than 95 psig (7500 torr). The pressure at the end of the hexafluoropropylene addition was 30 psig (2300 torr) and did not change over the 45-minute hold period. The reactor contents were allowed to cool and were one-plate distilled to obtain 307.1 g containing 90.6% 1,1,1,2,4,4,5,5,5-nonafluoro-2-trifluoromethyl-butan-3-one and 0.37% $C_6F_{12}$ (hexafluoropropylene dimer) as determined by gas chromatography. The crude fluorinated ketone was water-washed, distilled, and dried by contacting with silica gel to provide a fractionated fluorinated ketone of 99% purity and containing 0.4% hexafluoropropylene dimers.

A fractionated fluorinated ketone made as described above was purified of hexafluoropropylene dimers using the following procedure. Into a clean dry 600 mL Parr reactor equipped with stirrer, heater and thermocouple were added 61 g of acetic acid, 1.7 g of potassium permanganate, and 301 g of the above-described fractionated 1,1,1,2,4,4,5,5,5-nonafluoro-2-trifluoromethyl-butan-3-one. The reactor was sealed and heated to 60° C., while stirring, reaching a pressure of 12 psig (1400 torr). After 75 minutes of stirring at 60° C., a liquid sample was taken using a dip tube, the sample was phase split and the lower phase was washed with water. The sample was analyzed using gas chromatography and showed undetectable amounts of hexafluoropropylene dimers and small amounts of hexafluoropropylene trimers. A second sample was taken 60 minutes later and was treated similarly. The chromatographic analysis of the second sample showed no detectable dimers or trimers. The reaction was stopped after 3.5 hours, and the purified ketone was phase split from the acetic acid and the lower phase was washed twice with water. 261 g of the ketone was collected, having a purity greater than 99.6% by gas chromatography and containing no detectable hexafluoropropylene dimers or trimers.

n-$C_3F_7C(O)CF(CF_3)_2$—1,1,1,2,4,4,5,5,6,6,6-undecafluoro-2-trifluoromethylhexan-3-one Into a clean dry 600 mL Parr reactor equipped with stirrer, heater and thermocouple were added 5.8 g (0.10 mol) of anhydrous potassium fluoride and 108 g of anhydrous diglyme. The contents of the reactor were stirred and cooled with dry ice while 232.5 g (1.02 mol) of n-$C_3F_7COF$ (available from 3M Co., approximately 95.0 percent purity) was added to the sealed reactor. The reactor and its contents were then heated, and when a temperature of 72° C. had been reached, 141 g (0.94 mol) of hexafluoropropylene was added at a pressure of 85 psig (5150 torr) over a 3.25 hour time period. During the addition of hexafluoropropylene the temperature of the reactor was increased slowly to 85° C. while maintaining the pressure at less than 90 psig (5400 torr). The pressure at the end of the hexafluoropropylene addition was 40 psig (2800 torr) and did not change over an additional 4-hour hold period. The lower phase was fractionally distilled to give 243.5 grams of 1,1,1,2,4,4,5,5,6,6,6-undecafluoro-2-trifluoromethylhexan-3-one, having a boiling point of 72.5° C. and a purity of 99.9% as determined by gas chromatography. The structure was confirmed by gas chromatography and mass spectroscopy.

$(CF_3)_2CFC(O)CF(CF_3)_2$— 1,1,1,2,4,5,5,5,6,6,6-octafluoro-2,4-bis(trifluoromethyl)pentan-3-one 8.1 g (0.14 mol) of anhydrous potassium fluoride, 216 g (0.50 mol) of perfluoro(isobutyl isobutyrate) [need prep. or reference for making] and 200 grams of anhydrous diglyme were charged to a clean dry 600 mL Parr pressure reactor. After cooling the reactor to <0° C., 165 g (1.10 mol) of hexafluoropropylene was added to the resulting mixture. The contents in the reactor were allowed to react overnight at 70° C. with stirring, then the reactor was allowed to cool and the excess pressure in the reactor was vented to the atmosphere. The contents of the reactor were then phase split to obtain 362.5 g of lower phase. The lower phase was retained and mixed with lower phases saved from previous analogous reactions. To 604 g of accumulated lower phases containing 22% perfluoroisobutyryl fluoride and 197 g (1.31 mol) of hexafluoropropylene was added 8 g (0.1 mol) of anhydrous potassium fluoride and 50 g of anhydrous diglyme, and the resulting mixture was allowed to react in the Parr reactor in the same manner as before. This time 847 g of lower phase resulted, containing 54.4% of desired material and only 5.7% of perfluoroisobutyryl fluoride. The lower phase was then water washed, dried with anhydrous magnesium sulfate, and fractionally distilled to give 359 g of 1,1,1,2,4,5,5,5,6,6,6-octafluoro-2,4-bis(trifluoromethyl) pentan-3-one having 95.2% purity as determined by gas chromatography and mass spectroscopy\(47% theoretical yield) and having a boiling point of 73° C.

$CF_3(CF_2)_3C(O)CF(CF_3)_2$— 1,1,1,2,4,4,5,5,6,6,7,7,7-tridecafluoro-2-trifluoromethylheptan-3-one A mixture consisting of 775 g of perfluoropentanoyl fluoride, 800 g of anhydrous diglyme, 13.1 g of potassium fluoride, 17.8 g of anhydrous potassium bifluoride and 775 g of hexafluoropropylene was heated in a 3-liter stainless steel pressure vessel under autogeneous pressure at 50° C. for 16 hours. The product was fractionally distilled to give 413 g of 1,1,1,2,4,4,5,5,6,6,7,7,7-tridecafluoro-2-trifluoromethyl-heptan-3-one, having a boiling point of 97° C. and a 99.0% purity as determined by gas chromatography and mass spectroscopy.

$CF_3(CF_2)_5C(O)CF_3$—1,1,1,3,3,4,4,5,5,6,6,7,7,8,8,8-hexadecafluorooctan-2-one 1052 mL of 2-octyl acetate was converted to the perfluorinated ester via direct fluorination as described in U.S. Pat. No. 5,488,142 (Fall et al.). The resulting perfluorinated ester was treated with methanol to convert it to the hemiketal to allow distillation of the reaction solvent. 1272 g of the resulting hemiketal was slowly added to 1200 mL of concentrated sulfuric acid, and the resulting reaction mixture was re-fractionated to yield 1554.3 g of 1,1,1,3,3,4,4,5,5,6,6,7,7,8,8,8-hexadecafluoro-octan-2-one, having a boiling point of 97° C. and having a purity of 98.4% as measured by nuclear magnetic resonance spectroscopy.

$CF_3(CF_2)_5C(O)CF(CF_3)_2$—1,1,1,2,4,4,5,5,6,6,7,7,8,8,9,9,9-heptadecafluoro-2-trifluoromethyl-nonan-3-one A mixture consisting of 2027 g of trifluoroacetic acid pentadecafluoroheptyl ester (made by reacting heptyl acetate with fluorine gas as described in U.S. Pat. No. 5,399,718 (Costello et al.)), 777 g of 3M™ PF-5052 Performance Liquid (a mixture of perfluorinated solvents, available from 3M Company), 3171 g of anhydrous diglyme and 79 g of anhydrous potassium fluoride were added to a 2-gallon (7.6 L) stainless steel stirred pressure vessel. The vessel was heated and 1816 g of hexafluoropropylene was added over a 2-hour period while maintaining a reaction temperature of about 50° C. The vessel was held at 50° C. for an additional 1½ hours after the hexafluoropropylene addition was complete. The reactor was cooled and drained. The resulting liquid was phase split and the lower phase fractionally distilled to give 565 g of 1,1,1,2,4,4,4-heptafluoro-3-trifluoromethyl-butan-2-one having a boiling point of 25° C. and purity of 95% and 1427 g of 1,1,1,2,4,4,5,5,6,6,7,7,8,8,9,9,9-heptadecafluoro-2-trifluoromethyl-nonan-3-one, having a boiling point of 134° C. and a 98.5% purity as determined by gas chromatography and mass spectroscopy.

$CF_3O(CF_2)_2C(O)CF(CF_3)_2$—1,1,2,2,4,5,5,5-octafluoro-1-trifluoromethoxy-4-trifluoromethylpentan-3-one Into a clean dry 600 mL Parr reactor were added 11.6 g (0.20 mol) of anhydrous potassium fluoride and 113.5 g of anhydrous diglyme. The contents of the reactor were stirred and cooled with dry ice, then 230 g (0.96 mol) of $CF_3OCF_2CF_2COF$ (available from 3M Co., approximately 97 percent purity) was added to the sealed reactor using isolated vacuum. With the reactor at 80° C. and pressure of 80 psig (4900 torr), 154 g (1.03 mol) of hexafluoropropylene was gradually added over a 3½ hour time period. Following a one hour reaction hold time, the product was recovered from the reaction mixture by distillation and phase split prior to fractionation to give 100 g of 1,1,2,2,4,5,5,5-octafluoro-1-trifluoromethoxy-4-trifluoromethylpentan-3-one, having a boiling point of 77° C. and a purity of 99.8% as determined by gas chromatography. The structure was confirmed by gas chromatography and mass spectroscopy.

$ClCF_2C(O)CF(CF_3)_2$—1-chloro-1,1,3,4,4,4-hexafluoro-3-trifluoromethyl-butan-2-one To a clean dry 600 mL Parr pressure reactor was charged 53.5 g (0.92 mol) of anhydrous potassium fluoride, 150 g of anhydrous diglyme and 150 g of chlorodifluoroacetic anhydride. With the reactor set at 80° C. and 92 psig (5500 torr), 123 g (0.820 mol) of hexafluoropropylene was charged over a 3 hour period at a tank pressure not exceeding 120 psig (7000 torr). Following reaction for ½ hour at 80° C., the reactor contents were allowed to cool and were distilled to obtain 180.6 g of crude material. Upon fractional distillation, acetic acid/$KMnO_4$ treatment and refractionation of the crude material, 46.1 g (26% of theoretical yield) of $(CF_3)_2CFC(O)CF_2Cl$, a clear colorless liquid, was obtained having a purity of 98.8% as determined by gas chromatography.

$C_6F_{14}$—perfluorohexane

Perfluorohexane (mixed isomers) is available as 3M™ FLUORINERT PF-5060 Specialty Liquid from 3M Company, St. Paul, Minn.

$C_4F_9OCH_3$—perfluorobutyl methyl ether

Perfluorobutyl methyl ether is available as 3M™ NOVEC™ HFE-7100 Specialty Liquid from 3M Company.

$CF_3CFHCFHCF_2CF_3$—1,1,1,2,3,4,4,5,5,5-decafluoropentane

VERTREL™ XF is a hydrofluorocarbon available from E. I. duPont de Nemours, Wilmington, Del.

$C_3F_5HCl_2$—dichloropentafluoropropane $C_3F_5HCl_2$ is a hydrochlorofluorocarbon available as AK-225 from Asahi Glass Co. Ltd., Tokyo, Japan.

$CCl_2FCClF_2$—1,1,2-trichloro-1,2,2-trifluoroethane 1,1,2-trichloro-1,2,2-trifluoroethane, a chlorofluorocarbon, was formerly available as FREON™ TF from E. I. duPont de Nemours until enactment of the Montreal Protocol.

Z-DOL

FOMBLIN™ Z-DOL-TX is a functionalized perfluoropolyether lubricant available from Montedison S.p.A., Milan, Italy.

AM 3001

FOMBLIN™ AM 3001 is a functionalized perfluoropolyether lubricant available from Montedison S.p.A., Milan, Italy.

X-1P

X-1P is a cyclic phosphazene additive available from Dow Chemical Co., Midland, Mich.

Examples 1–3 and Comparative Examples C1–C5

In Examples 1–3, perfluoropolyether lubricants Z-DOL and AM 3001 and phosphazene additive X-1P were evaluated for solubility in $CF_3CF_2C(O)CF(CF_3)_2$, n-$C_3F_7C(O)CF(CF_3)_2$ and $(CF_3)_2CFC(O)CF(CF_3)_2$, all fluorinated ketone solvents within the scope of this invention.

In Comparative Examples C1–C5, the same fluorinated lubricants and phosphazene additive were evaluated for solubility in $C_6F_{14}$, $C_4F_9OCH_3$, $CF_3CFHCFHCF_2CF_3$, $C_3F_5HCl_2$ and $CCl_2FCClF_2$, all fluorinated solvents outside the scope of this invention.

Results from these solubility studies are presented in TABLE 1. The term "miscible" denotes that the lubricant and fluorinated solvent were miscible in all proportions, forming an essentially clear solution. Any number entry denotes solubility in the fluorinated solvent as percent by weight. The term "NT" denotes that the compound was not tested for solubility with the solvent.

TABLE 1

Miscibility Studies in Various Fluorinated Solvents

| Ex. | Solvent | Z-DOL | AM 3001 | X-1P |
|-----|---------|-------|---------|------|
| 1 | $CF_3CF_2C(O)CF(CF_3)_2$ | miscible | miscible | 0.03 |
| 2 | $n\text{-}C_3F_7C(O)CF(CF_3)_2$ | miscible | miscible | 0.03 |
| 3 | $(CF_3)_2CFC(O)CF(CF_3)_2$ | miscible | miscible | 0.03 |
| C1 | $C_6F_{14}$ | miscible | miscible | 0.025 |
| C2 | $C_4F_9OCH_3$ | miscible | miscible | miscible |
| C3 | $CF_3CFHCFHCF_2CF_3$ | miscible | miscible | miscible |
| C4 | $C_3F_5HCl_2$ | miscible | miscible | miscible |
| C5 | $CCl_2FCClF_2$ | miscible | miscible | NT |

The data in TABLE 1 show that the fluorinated ketones of this invention were good solvents for the Z-DOL and AM 3001 perfluoropolyether lubricants as were the other fluorinated solvents. However, the fluorinated ketones do not contribute to global warming as do perfluorocarbons such as perfluorohexane. Small amounts of the X-1P additive are soluble.

Examples 4–6 and Comparative Examples C6–C10

In Examples 4–6, dioctyl phthalate (DOP) and silicone oils having viscosities of 100, 1000 and 10000 centistokes (cst), all known detrimental "impurities" encountered in lubricant deposition processes, were evaluated for solubility in $CF_3CF_2C(O)CF(CF_3)_2$, $n\text{-}C_3F_7C(O)CF(CF_3)_2$ and $(CF_3)_2CFC(O)CF(CF_3)_2$, all fluorinated ketone solvents within the scope of this invention.

In Comparative Examples C6–C10, the same "impurities" were evaluated for solubility in $C_6F_{14}$ (a perfluorocarbon), $C_4F_9OCH_3$ (a hydrofluoroether), $CF_3CFHCFHCF_2CF_3$ (a hydrofluorocarbon), $C_3F_5HCl_2$ (a hydrochlorofluorocarbon), and $CCl_2FCClF_2$ (a chlorofluorocarbon), all fluorinated solvents outside the scope of this invention.

The fluorinated solvents (both ketone and comparative) were also tested for their ability to dissolve normal hydrocarbons of increasing molecular weight according to a test procedure similar to that described in U.S. Pat. No. 5,275,669 (Van Der Puy et al.), the description of which is incorporated herein by reference. Following this test procedure, 0.5 to 2 mL of the test solvent was added to a vial. An equal volume of n-octane ($n\text{-}C_8H_{18}$) was then added to the same vial. The vial was sealed by closing the lid, then the vial was shaken to mix the two components. If a cloudy mixture or a phase split occurred after settling undisturbed for several minutes, the solvent was given an LSH ("largest soluble hydrocarbon") rating of <8. If a clear solution resulted, the test was repeated, substituting n-nonane ($n\text{-}C_9H_{20}$) for n-octane. If a cloudy mixture or a phase split occurred, the solvent was given an LSH rating of 8. The test was continually repeated with higher homologue n-alkanes until a cloudy mixture or a phase split occurred. The LSH rating given corresponded to the carbon chain length of the largest soluble n-alkane which formed a homogeneous solution at equal volumes with the test solvent. For example, if n-decane ($n\text{-}C_{10}H_{22}$) was soluble but n-undecane ($n\text{-}C_{11}H_{24}$) caused a phase split, the LSH rating was recorded as 10.

Results from these "impurity" solubility tests are presented in TABLE 2. The term "NT" denotes that the impurity was not tested in the fluorinated solvent.

TABLE 2

Solubility of Various Impurities in Fluorinated Solvents

| Ex. | Solvent | DOP | Silicone 100 cst | Silicone 1000 cst | Silicone 10000 cst | LSH |
|-----|---------|-----|------------------|-------------------|--------------------|-----|
| 4 | $CF_3CF_2C(O)CF(CF_3)_2$ | 0.024 | <0.01 | <0.01 | <0.01 | 6 |
| 5 | $n\text{-}C_3F_7C(O)CF(CF_3)_2$ | NT | NT | NT | NT | 6 |
| 6 | $(CF_3)_2CFC(O)CF(CF_3)_2$ | NT | NT | NT | NT | 5 |
| C6 | $C_6F_{14}$ | <0.2 | <1 | <1 | <1 | NT |
| C7 | $C_4F_9OCH_3$ | 5 | <1 | <1 | <1 | 9 |
| C8 | $CF_3CFHCFHCF_2CF_3$ | >30 | <1 | <1 | <1 | 7 |
| C9 | $C_3F_5HCl_2$ | NT | NT | NT | NT | NT |
| C10 | $CCl_2FCClF_2$ | NT | NT | NT | NT | NT |

Results from TABLE 2 show that the fluorinated ketones of this invention are relatively poor solvents for the detrimental impurities typically encountered in lubricant deposition systems. Also, the largest soluble hydrocarbon for the fluorinated ketones was lower than for the hydrofluoroether or hydrofluorocarbon, indicating a lesser tendency to dissolve non-fluorinated oils.

Example 7

Z-DOL was evaluated for solubility in the following fluorinated ketones:

$CF_3(CF_2)_5C(O)CF_3$ $ClCF_2C(O)CF(CF_3)_2$ $CF_3(CF_2)_3C(O)CF(CF_3)_2$ $CF_3O(CF_2)_2C(O)CF(CF_3)_2$ $CF_3(CF_2)_5C(O)CF(CF_3)_2$

The Z-DOL was soluble to at least 10% by weight in all of the ketones. These high solubilities indicate that these fluorinated ketones can be excellent perfluoropolyether lubricant deposition solvent candidates for magnetic media applications.

From the foregoing detailed description it will be evident that modifications can be made in the methods of the invention without departing from the spirit or scope of the invention. Therefore, it is intended that all modifications and variations not departing from the spirit of the invention come within the scope of the claims and their equivalents.

We claim:

1. A lubricant composition comprising:
   (a) a perfluoropolyether lubricant in the range of about 10 to about 10,000 ppm based on the weight of the lubricant composition; and
   (b) a fluorinated ketone solvent in the range of about 90 to about 99.9 weight percent based on the weight of the lubricant composition.

2. The lubricant composition of claim 1, wherein the fluorinated ketone has 5 to 10 carbon atoms and up to two hydrogen atoms.

3. The lubricant composition of claim 2, wherein the fluorinated ketone has up to two halogens selected from the group consisting of chlorine, bromine, iodine, and mixtures thereof.

4. The lubricant composition of claim 2, wherein the fluorinated ketone contains along the carbon backbone a heteroatom selected from the group consisting of nitrogen, oxygen, sulfur, and mixtures thereof.

5. The lubricant composition of claim 2, wherein the fluorinated ketone is a perfluoroketone.

6. The lubricant composition of claim 5, wherein the perfluoroketone has 6 to 8 carbon atoms.

7. The lubricant composition of claim 6, wherein the fluorinated ketone is selected from the group consisting of $CF_3(CF_2)_5C(O)CF_3$, $CF_3CF_2CF_2C(O)CF_2CF_2CF_3$, $CF_3CF_2C(O)CF(CF_3)_2$, $(CF_3)_2CFC(O)CF(CF_3)_2$, $(CF_3)_2CFCF_2C(O)CF(CF_3)_2$, $CF_3(CF_2)_2C(O)CF(CF_3)_2$, $CF_3(CF_2)_3C(O)CF(CF_3)_2$, $CF_3CF_2C(O)CF_2CF_2CF_3$, $CF_3OCF_2CF_2C(O)CF(CF_3)_2$, $CF_3OCF_2C(O)CF(CF_3)_2$, and perfluorocyclohexanone.

8. The lubricant composition of claim 1, wherein the fluorinated ketone has a boiling point of less than about 150° C.

9. The lubricant composition of claim 1, wherein up to 10 weight percent of the fluorinated ketone solvent is replaced with a co-solvent selected from the group consisting of a hydrofluorocarbon, hydrochlorofluorocarbon, perfluorocarbon, perfluoropolyether, hydrofluoroether, hydrochlorofluoroether, hydrofluoropolyether, fluorinated aromatic compound, chlorofluorocarbon, bromofluorocarbon, bromochloroflurocarbon, hydrobromocarbon, iodofluorocarbon, hydrobromofluorocarobn, and mixtures thereof.

10. The lubricant composition of claim 9, wherein the co-solvent has 5 to 10 carbon atoms.

11. The lubricant composition of claim 1, further comprising 0.1 to 1,000 ppm of an additive.

12. The lubricant composition of claim 11, wherein the additive is a cyclic phosphazene compound.

13. The lubricant composition of claim 1, wherein the perfluoropolyether lubricant comprises a perfluoropolyether compound represented by the formula:

$$A-[(C_yF_{2y})O(C_4F_8O)_k(C_3F_6O)_m(C_2F_4O)_n(CF_2O)_p(C_zF_{2z})]-A'$$

wherein:
   (a) y is an integer from 0 to about 20;
   (b) z is an integer from 0 to about 20;
   (c) k, m, n, and p are independent integers from 0 to about 200, wherein the sum of k, m, n, and p ranges from 2 to about 200; and
   (d) the A and A' end groups are independently selected monovalent organic moieties.

14. The lubricant composition of claim 13, Wherein at least one of the A and A' end groups is a hydrogen-containing monovalent organic moiety.

15. A lubricant composition comprising:
   (a) about 10 to about 10,000 ppm perfluoropolyether lubricant based on the weight of the lubricant composition, wherein the perfluoropolyether lubricant comprises a perfluoropolyether compound represented by the formula:

$$A-[(C_yF_{2y})O(C_4F_8O)_k(C_3F_6O)_m(C_2F_4O)_n(CF_2O)_p(C_zF_{2z})]-A'$$

wherein:
   (i) y is an integer from 0 to about 20;
   (ii) z is an integer from 0 to about 20;
   (iii) k, m, n, and p are independent integers from 0 to about 200, wherein the sum of k, m, n, and p ranges from 2 to about 200; and
   (iv) the A and A' end groups are independently selected monovalent organic moieties; and
   (b) about 90 to about 99.9 weight percent a fluorinated ketone solvent based on the weight of the lubricant composition, wherein the fluorinated ketone solvent has 5 to 10 carbon atoms, up to two hydrogen atoms, and up to two halogens selected from the group consisting of chlorine, bromine, iodine, and mixtures thereof.

16. A method of lubricating a substrate comprising:
   (a) applying to a substrate a coating of a lubricant composition according to claim 1; and
   (b) removing the fluorinated solvent form the coating.

17. The method of claim 15, wherein the substrate is magnetic media.

* * * * *

UNITED STATES PATENT AND TRADEMARK OFFICE
CERTIFICATE OF CORRECTION

PATENT NO. : 6,403,149 B2
DATED : June 11, 2002
INVENTOR(S) : Parent, Michael J.

It is certified that error appears in the above-identified patent and that said Letters Patent is hereby corrected as shown below:

Title page,
Item [56], FOREIGN PATENT DOCUMENTS, the following references should be added:

-- WO    WO 96/01303    1/1996
   WO    WO 01/05468    1/2002 --

Column 4,
Line 46, "$F(C_3F_6O)_2 CF_2H$," should read -- $F(C_3F_6O)_2CF_2H$, --

Column 7,
Line 20, "$-(C_tH_{2t}t)NCO$," should read -- $-(C_tH_{2t})NCO$," --
Line 65, "where in" should read -- wherein --

Column 13,
Lines 36, 37, "–1,1,1 ,2,4,4,5,5,6,6,7,7,8,8,9,9,9-" should read -- –1,1,1,2,4,4,5,5,6,6,7,7,8,8,9,9,9- --

Column 14,
Lines 25 and 26, "3M™ FLUORINERT" should read -- 3M™ FLUORINERT™ --

Column 18,
Line 16, "Wherein" should read -- wherein --

Signed and Sealed this

Twenty-seventh Day of May, 2003

JAMES E. ROGAN
*Director of the United States Patent and Trademark Office*